(12) United States Patent
Whitfield et al.

(10) Patent No.: US 8,233,605 B2
(45) Date of Patent: Jul. 31, 2012

(54) METHODS, SYSTEMS, AND PRODUCTS FOR MONITORING CONFERENCES

(75) Inventors: Lloyd Whitfield, Atlanta, GA (US); James Carlton Bedingfield, Lilburn, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1167 days.

(21) Appl. No.: 11/649,030

(22) Filed: Jan. 3, 2007

(65) Prior Publication Data

US 2008/0159509 A1  Jul. 3, 2008

(51) Int. Cl.
*H04M 3/42* (2006.01)

(52) U.S. Cl. ............ 379/202.01; 379/93.21; 379/158; 348/14.09; 370/260

(58) Field of Classification Search ............ 379/202.01, 379/158, 93.21, 204.01; 348/14.08, 14.09; 370/260

See application file for complete search history.

(56) References Cited

U.S. PATENT DOCUMENTS

| | | | |
|---|---|---|---|
| 6,363,411 B1 | 3/2002 | Dugan | |
| 6,404,873 B1 | 6/2002 | Beyda | |
| 6,839,417 B2 | 1/2005 | Weisman | |
| 6,940,826 B1 * | 9/2005 | Simard et al. | 370/260 |
| 6,947,525 B2 | 9/2005 | Benco | |
| 7,843,486 B1 * | 11/2010 | Blair et al. | 348/14.01 |
| 2003/0035527 A1 | 2/2003 | Baker | |
| 2003/0185369 A1 | 10/2003 | Oliver | |
| 2005/0031110 A1 | 2/2005 | Haimovich | |
| 2005/0259803 A1 | 11/2005 | Khartabil | |
| 2006/0181608 A1 * | 8/2006 | Knappe et al. | 348/14.09 |

* cited by examiner

*Primary Examiner* — Antim Shah
(74) *Attorney, Agent, or Firm* — Scott P. Zimmerman PLLC

(57) ABSTRACT

Methods, systems, and products are disclosed for monitoring a conference. A first bridging function is established that bridges together signals received from all conference participants. A second bridging function is established that bridges together signals received from i) a subset of the conference participants, ii) an output of the first bridging function, and iii) a monitor of the conference. The second bridging function isolates the monitor's signals from the conference such that only the subset of the conference participants may communicate with the monitor during the conference.

14 Claims, 9 Drawing Sheets

METHODS, SYSTEMS, AND PRODUCTS FOR MONITORING CONFERENCES

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

The exemplary embodiments generally relate to communications and, more particularly, to monitoring video and/or audio conferences.

Monitoring of conferences is needed. When a conference is established, one or more "monitors" may wish to oversee the conference, without being detected by the conference participants. The monitor may even wish to selectively communicate with a conference participant, again without being detected by the other conference participants. A trainer, for example, may wish to "listen in" on a telemarketing conversation and "coach" the telemarketer, without the called party hearing the coach's instructions. A supervisor may wish to train a sales person during a video conference, without the customer knowing of the supervisor's participation. What is needed, then, are methods, systems, and products for monitoring video, audio, and/or telephone conferences without the monitor's comments being detected by all the participants.

SUMMARY

The exemplary embodiments provide methods, systems, and products for monitoring conferences. These exemplary embodiments describe how a monitoring party may oversee a conference and even privately conduct a sub-conference. The monitoring party may listen to an audio conference and privately communicate with one or more of the participants. Similarly, exemplary embodiments allow the monitoring party to watch a video conference and privately communicate with one or more of the participants. The monitoring party's comments are only received by a chosen participant—the monitoring party's comments are isolated from the other conference participants. The monitoring party is thus able to advise or instruct the chosen participant without the other conference participants knowing of the monitor's participation.

Exemplary embodiments include a method for monitoring a conference. A first bridging function is established that bridges together signals received from all conference participants. A second bridging function is established that bridges together signals received from i) a subset of the conference participants, ii) an output of the first bridging function, and iii) a monitor of the conference. The second bridging function isolates the monitor's signals from the conference such that only the subset of the conference participants may communicate with the monitor during the conference.

More exemplary embodiments include a system for monitoring a conference. A conferencing application is stored in memory, and a processor communicates with the memory and executes the conferencing application. The conferencing application instructs the processor to establish a first bridging function that bridges together signals received from all conference participants. The conferencing application instructs the processor to establish a second bridging function that bridges together signals received from i) a subset of the conference participants, ii) an output of the first bridging function, and iii) a monitor of the conference. The second bridging function isolates the monitor's signals from the conference, such that only the subset of the conference participants may communicate with the monitor during the conference.

Other exemplary embodiments describe a computer program product for monitoring a conference. A first bridging function is established that bridges together signals received from all conference participants. A second bridging function is established that bridges together signals received from i) a subset of the conference participants, ii) an output of the first bridging function, and iii) a monitor of the conference. The second bridging function isolates the monitor's signals from the conference such that only the subset of the conference participants may communicate with the monitor during the conference.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
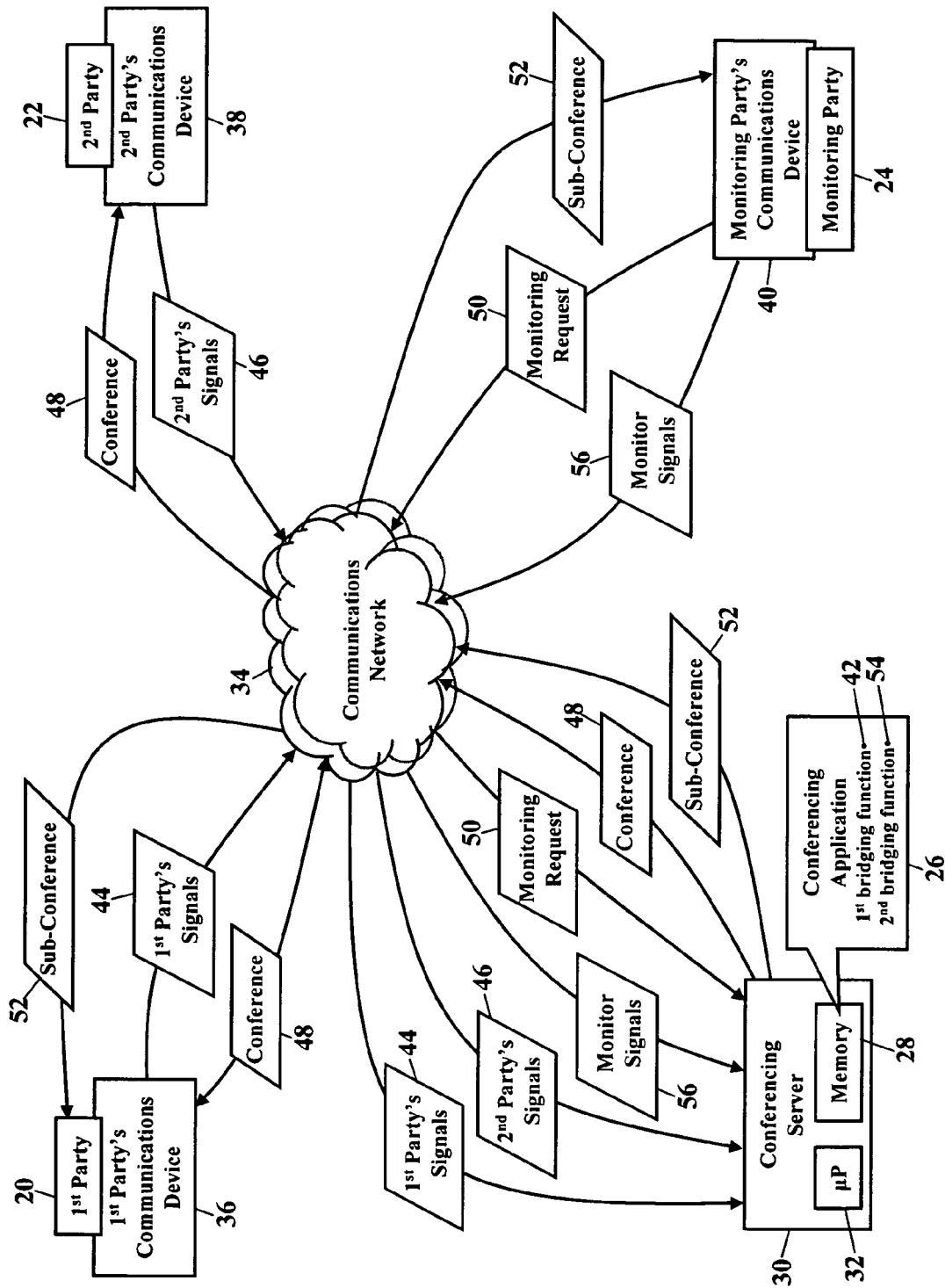
FIG. 1 is a simplified schematic illustrating an operating environment for exemplary embodiments of this invention.

FIG. 1 is a simplified schematic illustrating an operating environment for exemplary embodiments of this invention. A first party 20 and a second party 22 wish to engage in an electronic conference. The first party 20 and the second party 22 may wish to establish a video conference, an audio conference, and/or a telephone conference. A monitoring party 24 also wishes to participate, but the monitoring party 24 does not want the second party 22 to know of that participation. That is, the monitoring party 24 and the first party 20 wish to establish a private sub-conference in which the monitor's comments are only received by the first party 20. The first party 20 and the second party 22 communicate via the conference, but the monitoring party's comments are isolated from the second party 22. The monitoring party 24 is thus able to advise or instruct the first party 20 without the second party's knowledge.

The conference is established by a conferencing application 26. The conferencing application 26 is a set of processor-executable instructions that are stored in memory 28 of a conferencing server 30. A processor 32 executes the conferencing application 26. The conferencing application 26 is a software engine that permits monitoring of the conference. A communications network 34 allows the conferencing server 30 to communicate with the first party's communications device 36, with the second party's communications device 38, and with the monitoring party's communications device 40. The conferencing application 26 instructs the processor 32 to establish a first bridging function 42 that mixes together first party signals 44 (received from the first party's communications device 36) and second party signals 46 (received from the second party's communications device 38). The first bridging function 42 thus establishes a conference 48 between the first party's communications device 36 and the second party's communications device 38.

A sub-conference is then established. The conferencing application 26 instructs the processor 32 to monitor the conference for a monitoring request 50. The monitoring request 50 is any input, entry, and/or predetermined information that indicates a sub-conference is desired. The conferencing application 26 may monitor the first bridging function 42 for the monitoring request 50 that establishes the second bridging function 54. The second bridging function 54 creates or establishes the sub-conference between the first party 20 and the monitoring party 24. As the first party 20 and the second party 22 engage in the conference, the conferencing application 26 instructs the processor 32 to monitor the first bridging function 42 for monitoring request 50. The monitoring request 50, for example, may be any packetized data that the processor 32 recognizes to implement the second bridging function 54. The monitoring request 50, for example, may be a predetermined DTMF entry, a data packet, or keyboard/keypad/button entry that indicates the sub-conference is desired.

Whatever the monitoring request 50 may be, the sub-conference 52 is established. The conferencing application 26 instructs the processor to establish a second bridging function 54 that mixes together the first party signals 46, the second party signals 48, and monitor signals 56 (received from the monitoring party's communications device 40). The conferencing application 26 thus instructs the processor 32 to establish two separate bridging functions, yet the second bridging function 54 isolates the monitor signals 56 from the second party 22. Because the monitor signals 56 may not be shared with, or communicated to, the second party's communications device 38, only the first party 20 receives the monitor signals 56. As the first party 20 and the second party 22 engage in the conference 48, the monitoring party's video and/or audio comments are isolated from the second party 22. The monitoring party 24 is thus able to advise or instruct the first party 20 without the second party's knowledge.

The conferencing server 30 is only simply illustrated. Because the architecture and operating principle of the conferencing server 30 is well known, the hardware and software components of the conferencing server 30 are not further shown and described. If the reader desires more details, the reader is invited to consult the following sources, all incorporated herein by reference in their entirety: ANDREW TANENBAUM, COMPUTER NETWORKS (4$^{th}$ edition 2003); WILLIAM STALLINGS, COMPUTER ORGANIZATION AND ARCHITECTURE: DESIGNING FOR PERFORMANCE (7$^{th}$ Ed., 2005); and DAVID A. PATTERSON & JOHN L. HENNESSY, COMPUTER ORGANIZATION AND DESIGN: THE HARDWARE/SOFTWARE INTERFACE (3$^{rd}$. Edition 2004).

Some aspects of conferencing are known, so this disclosure will not greatly explain the known details. If the reader desires more details, the reader is invited to consult the following sources, all incorporated herein by reference in their entirety: U.S. Pat. No. 6,363,411 to Dugan et al. (Mar. 26, 2002); U.S. Pat. No. 6,404,873 to Beyda et al. (Jun. 11, 2002); U.S. Pat. No. 6,839,417 to Weisman et al. (Jan. 4, 2002); U.S. Pat. No. 6,947,525 to Benco (Sep. 20, 2005); Published U.S. patent application 2003/0035527 to Baker (Feb. 20, 2003); Published U.S. patent application 2003/0185369 to Oliver et al. (Oct. 2, 2003); Published U.S. patent application 2005/0031110 to Haimovich et al. (Feb. 10, 2005); and Published U.S. patent application 2005/0259803 to Khartabil (Nov. 24, 2005).

Figure 2:
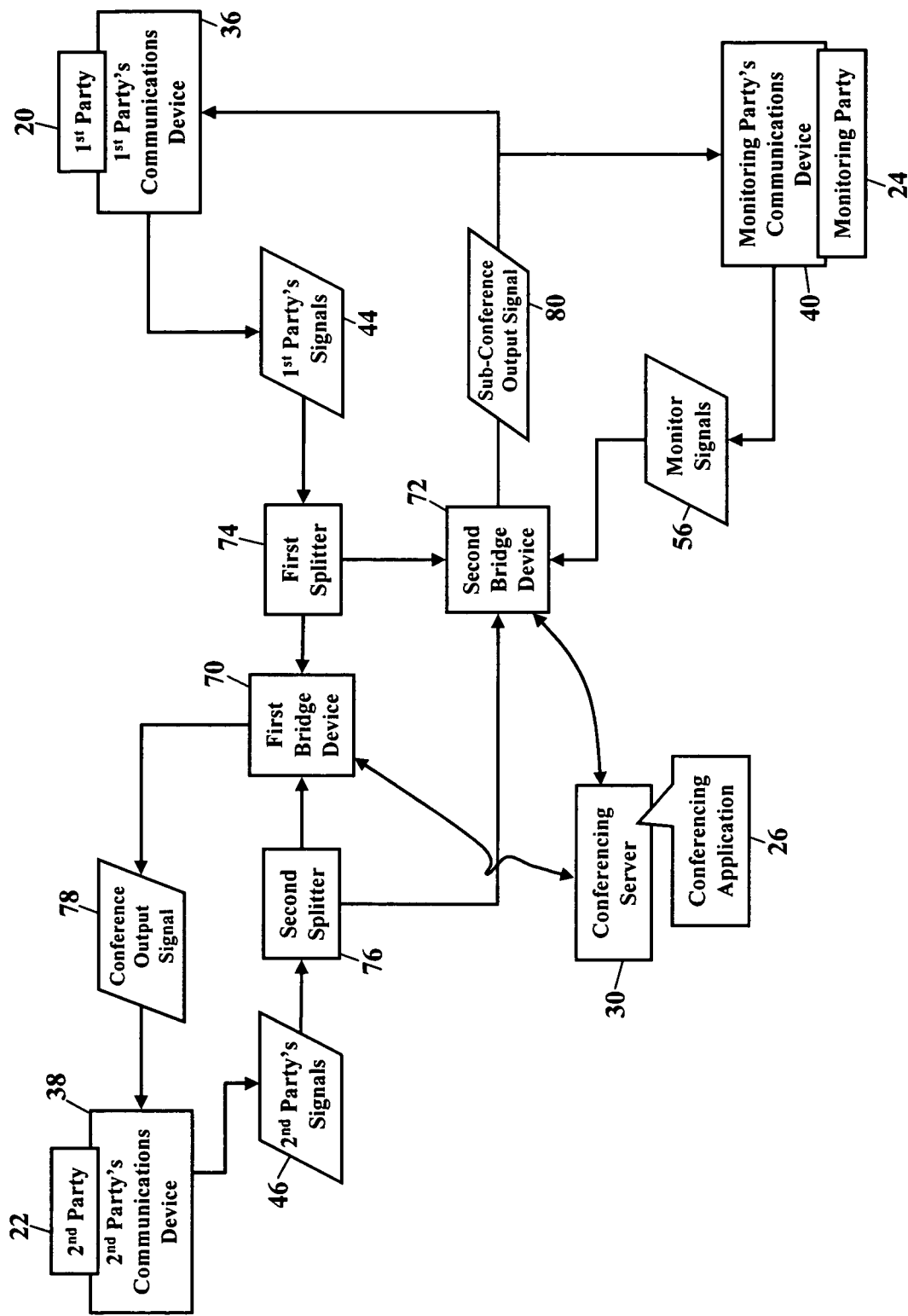
FIG. 2 is a schematic illustrating separate bridging devices, according to more exemplary embodiments.

FIG. 2 is a schematic illustrating separate bridging devices, according to more exemplary embodiments. Here the conferencing server 30 interfaces with a first bridge device 70 and with a second bridge device 72 via the communications network (shown as reference numeral 34 in FIG. 1). The first party signals 44 (received from the first party's communications device 36) are split in a first splitter 74 and received as an input to the first bridge device 70. The second party signals 46 (received from the second party's communications device 38) are split in a second splitter 76 and received as another input to the first bridge device 70. The conferencing application 26 instructs the first bridge device 70 to bridge or mix together the first party signals 44 with the second party signals 46. The first bridge device 70 has a conference output signal 78 that is communicated to the second party's communications device 38. The first bridge device 70 thus allows the first party 20 and the second party 22 to engage in a conferenced communication.

A second bridging function is also established. The first party signals 44 are split in the first splitter 74 and received as an input to the second bridge device 72. The second party signals 46 are split in the second splitter 76 and received as an input to the second bridge device 72. The second bridge device 72 thus receives both the first party signals 44 and the second party signals 46 as inputs. The monitor signals 56 (received from the monitoring party's communications device 40) are also received as an input to the second bridge device 72. The conferencing application 26 instructs the second bridge device 72 to bridge or mix together the first party signals 44, the second party signals 46, and the monitor signals 56. The second bridge device 72 has a sub-conference output signal 80 that is communicated to both the first party's communications device 36 and to the monitoring party's communications device 40.

The second party 22 is thus isolated from the monitoring party 24. As the first party 20 and the second party 22 engage in the conference, the second bridge device 72 allows the monitoring party 24 to monitor or "listen in" on that conference. Because the second bridge device 72 receives both the first party signals 44 and the second party signals 46 as inputs, the monitoring party 24 may receive any visible (e.g., via a video conference) or audible comments made by either party. The second bridge device 72, however, also allows the monitoring party 24 to privately participate without the second party's knowledge. Because the sub-conference output signal 80 from the second bridge device 72 is not shared with the second party's communications device 38, the second party 22 does not receive the monitoring party's comments. While the conference is ongoing, the monitoring party 24 is thus able to coach or instruct the first party 20 without the second party 22 being aware of that participation.

Figure 3:
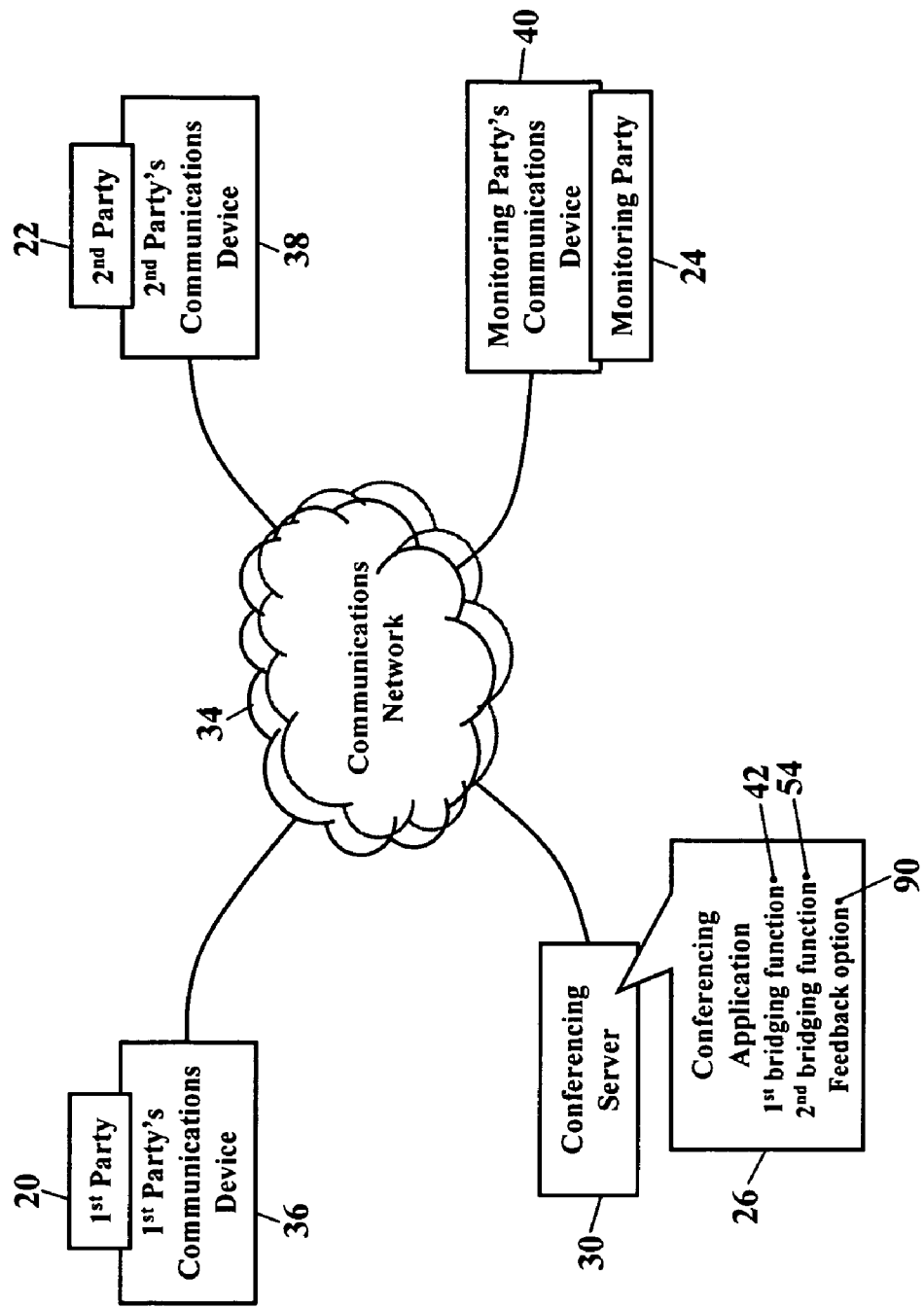
FIG. 3 is a schematic illustrating a feedback option, according to still more exemplary embodiments.

FIG. 3 is a schematic illustrating a confirmation feedback option 90, according to still more exemplary embodiments. Here the conferencing application 26 may be configured to provide feedback to the sub-conference participants. When the conferencing application 26 establishes the second bridging function 54, the second bridging function 54 isolates the monitor signals (shown as reference numeral 56 in FIGS. 1 and 2) from the second party 22. As the first party 20 and the second party 22 engage in the conference, the monitoring party 24 and the first party 20 may engage in a private sub-conference. The conferencing application 26, then, may be configured to provide some confirmation, feedback, or indication that the sub-conference is established and properly working. After all, if the sub-conference is not properly established, the second party 22 may discover the monitoring party's participation. If the monitoring party's participation is discovered, the first party 20 could be embarrassed or endangered, and the second party 22 could be angered.

Confirmation feedback, then, may be appropriate. The conferencing application 26 may provide feedback or some indication that the second bridging function 54 is established and properly working. This feedback may be any audio or video indicator. If a video conference is established, for example, the feedback may be a tinted overlay, separate window, or graphical icon that indicates the sub-conference is established. The conferencing application 26 may add a background tone or sound to audio portions to indicate the sub-conference is properly established. The conferencing application 26 may periodically add a tonal alert, "ping," or announcement during the sub-conference call. The conferencing application 26 may periodically send messages to the sub-conference participants, and those messages inform the sub-conference participants that the sub-conference is properly established. The feedback may be provided whenever any sub-conference participant presses a particular key or sequence of keys, thus causing the conferencing application 26 to verify the sub-conference is properly established.

Figure 4:
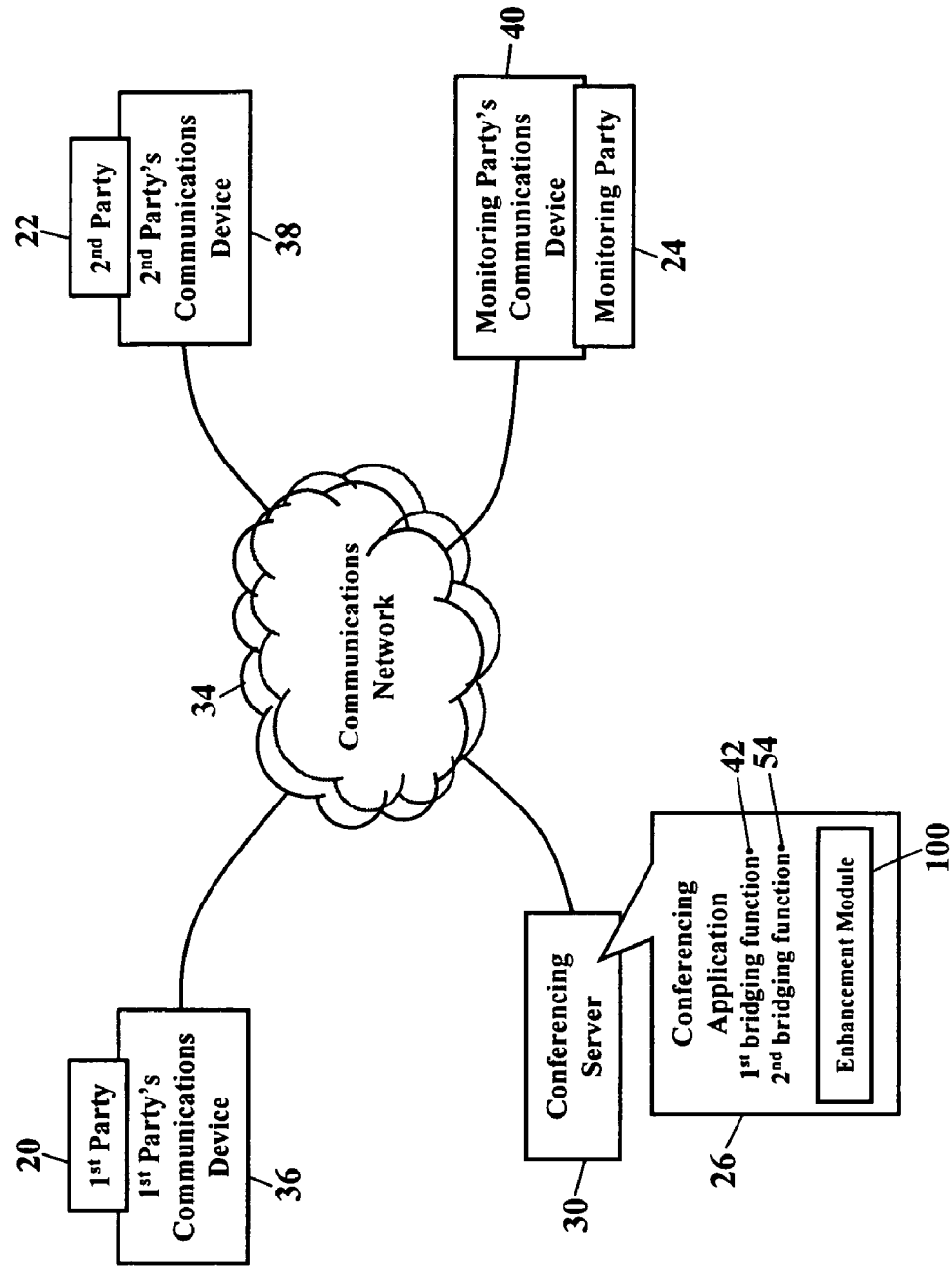
FIG. 4 is a schematic illustrating another enhancement to the conference, according to yet more exemplary embodiments.

FIG. 4 is a schematic illustrating another enhancement to the conference, according to yet more exemplary embodiments. Here the conferencing application 26 may distinguish the monitor's participation from that of other participants. As the conferencing application 26 processes the monitor signals (shown as reference numeral 56 in FIGS. 1 and 2), the conferencing application 26 may invoke an enhancement module 100. The enhancement module 100 provides instructions that distinguish the monitor signals from the other participants. The enhancement module 100, for example, may add or overlay a background tint or icon that distinguishes the monitor's video presence. The enhancement module 100 may add a continuous or periodic tone or sound to distinguish the monitor signals. The monitor's volume may be increased or decreased from other participants. When audio signals are received from the monitoring party's communications device 40, the enhancement module 100 may block one or more participant's comments. The monitor signals may be filtered or processed to produce any distinctive characteristic. The enhancement module 100 may even implement stereophonic features that isolate the monitor's comments to one ear, while other participant's comments are reserved for the opposite ear. The monitor's voice may thus be panned or cast in one direction, while another participant's voice is panned or cast to another direction.

The enhancement module 100 may even implement security features. As the above paragraphs alluded, if the monitoring party's participation is discovered, the monitoring party 24 may be embarrassed or even endangered. The enhancement module 100, then, may be configured to conceal the monitoring party's presence or participation. The enhancement module 100, for example, may blur or block the monitor's video presence to thwart identification. The enhancement module 100 may process the monitor signals to distort or disguise the monitor's presence, in case the monitor's presence is discovered.

Figure 5:
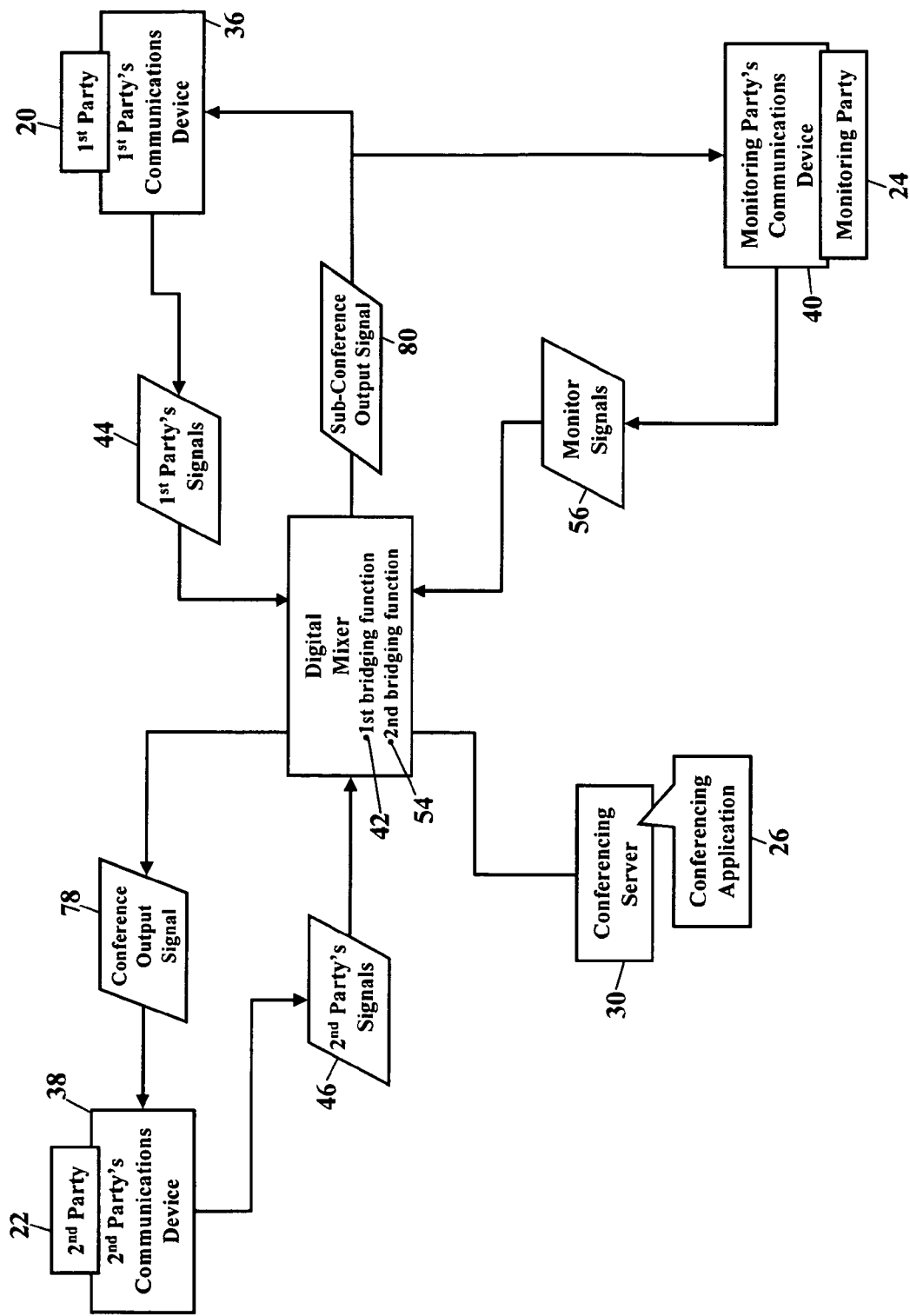
FIG. 5 is a schematic illustrating an alternative operating environment, according to more exemplary embodiments.

FIG. 5 is a schematic illustrating an alternative operating environment, according to more exemplary embodiments. Here the conferencing server 30 interfaces with and controls a digital mixer 110 via the communications network (shown as reference numeral 34 in FIG. 1). The digital mixer 110 has multiple inputs and multiple outputs, and the digital mixer 110 may store a table or matrix in memory. The table or matrix allows the conferencing application 26 to request or to establish arbitrary associations or connections between any of the inputs and any of the outputs. The digital mixer 110 has a first input that receives the first party signals 44. The digital mixer 110 has a second input that receives the second party signals 46. The conferencing application 26 instructs the digital mixer 110 to establish the first bridging function 42 that mixes together the first party signals 44 with the second party signals 46 to create the conference output signal 78. The conferencing application 26 also instructs the digital mixer 110 to associate the conference output signal 78 to an output port, and the digital mixer 110 communicates the conference output signal 78 to the second party's communications device 38. The first party 20 and the second party 22 thus communicate via the bridged conference connection.

The conferencing application 26 also establishes the sub-conference. The conferencing application 26 monitors the first bridging function 42 for the monitoring request (shown as reference numeral 50 in FIG. 1). The monitoring request initiates and/or establishes the second bridging function 54. When the conferencing application 26 receives the monitoring request, the conferencing application 26 instructs the digital mixer 110 to receive the monitor signals 56 as a third input. The conferencing application 26 also instructs the digital mixer 110 to mix together the first party signals 44, the second party signals 46, and the monitor signals 56 to create the sub-conference output signal 80. The conferencing application 26 also instructs the digital mixer 110 to associate the sub-conference output signal 80 to an output port, and the digital mixer 110 communicates the sub-conference output signal 80 to both the first party's communications device 36 and to the monitoring party's communications device 40.

The digital mixer 110 thus establishes the sub-conference. Because the sub-conference output signal 80 is not shared with the second party's communications device 38, the second party 22 does not receive the monitoring party's comments. While the conference is ongoing, the monitoring party 24 is thus able to coach or instruct the first party 20 without the second party 22 being aware of that participation. The second party 22 is thus isolated from the monitoring party's comments.

Figure 6:
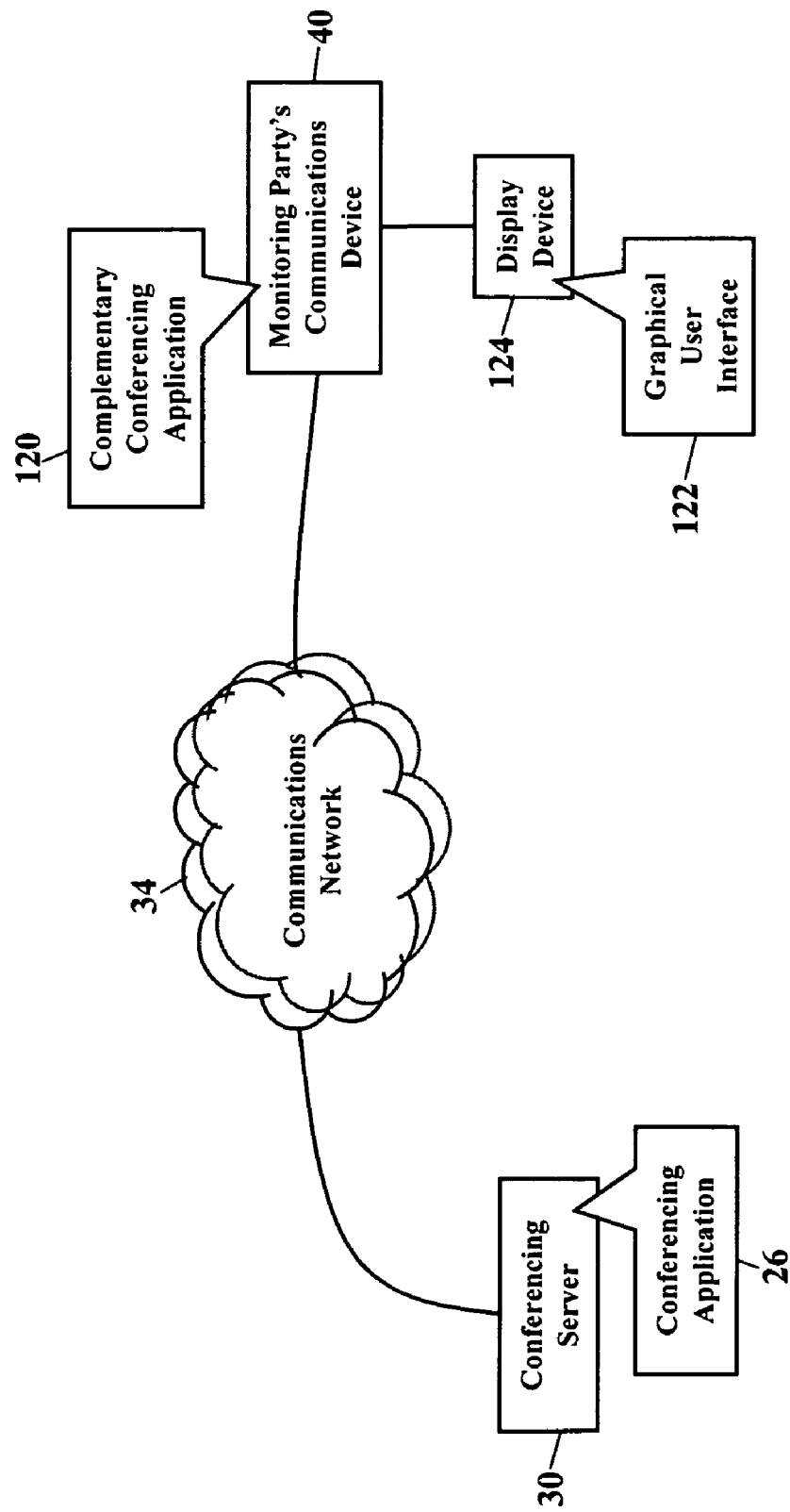
FIGS. 6 and 7 are schematics illustrating a method of monitoring the conference, according to still more exemplary embodiments.
Figure 7:
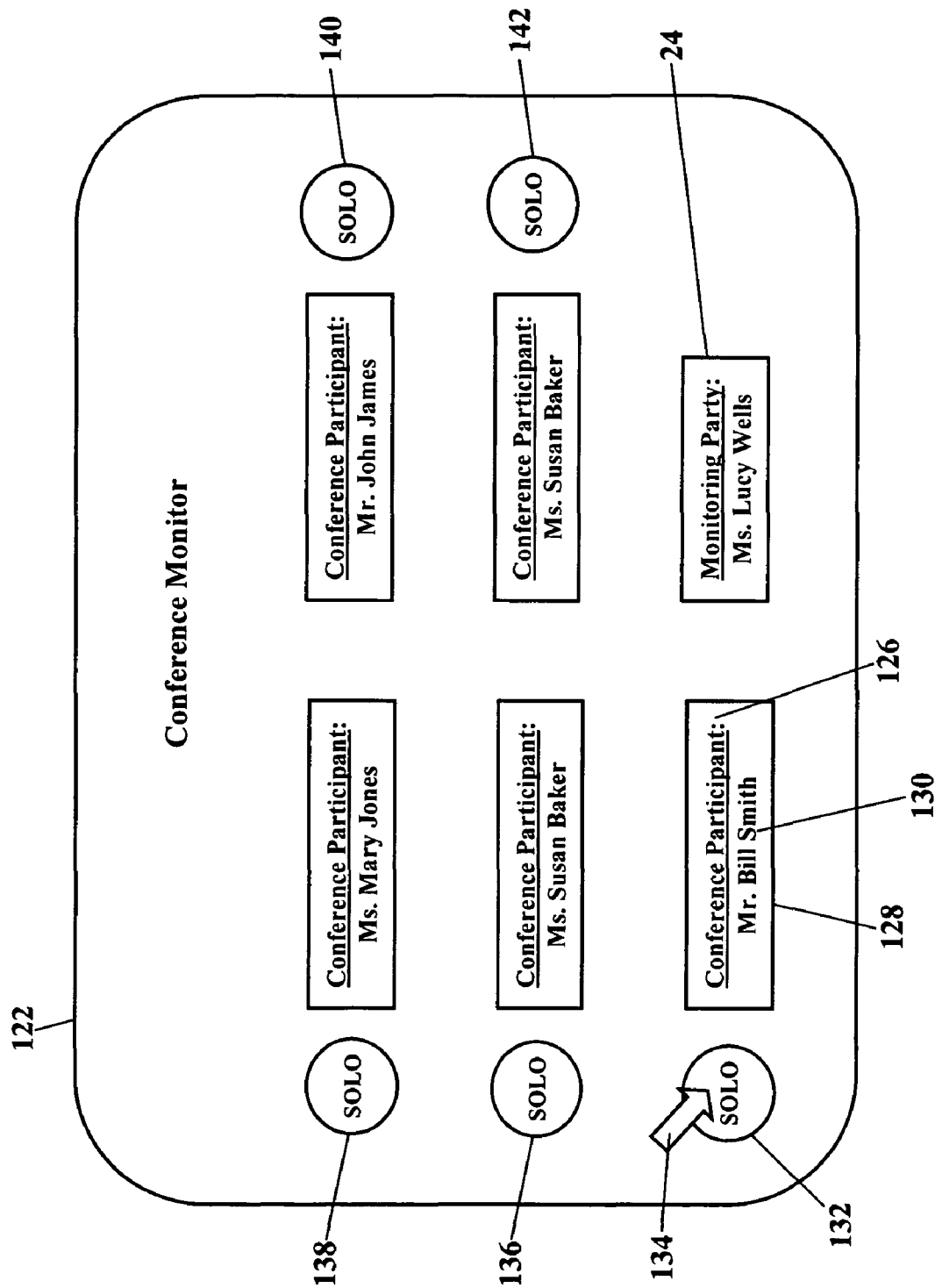

FIGS. 6 and 7 are schematics illustrating a method of monitoring the conference, according to still more exemplary embodiments. Here the conferencing server 30 stores and executes the conferencing application 26, while the monitoring party's communications device 40 stores and executes a complementary conferencing application 120. The conferencing application 26 and the complementary conferencing application 120 cooperate to establish and to control sub-conferences. A graphical user interface 122 is visually presented on a display device 124 by the complementary conferencing application 120. The graphical user interface 122 receives inputs from the monitoring party's communications device 40, and those inputs are communicated via the communications network 34 to the conferencing server 30. The conferencing application 26 interprets those inputs to establish and control the sub-conference. The use and operation of the graphical user interface 122 is known and thus not further discussed.

Figure 8:
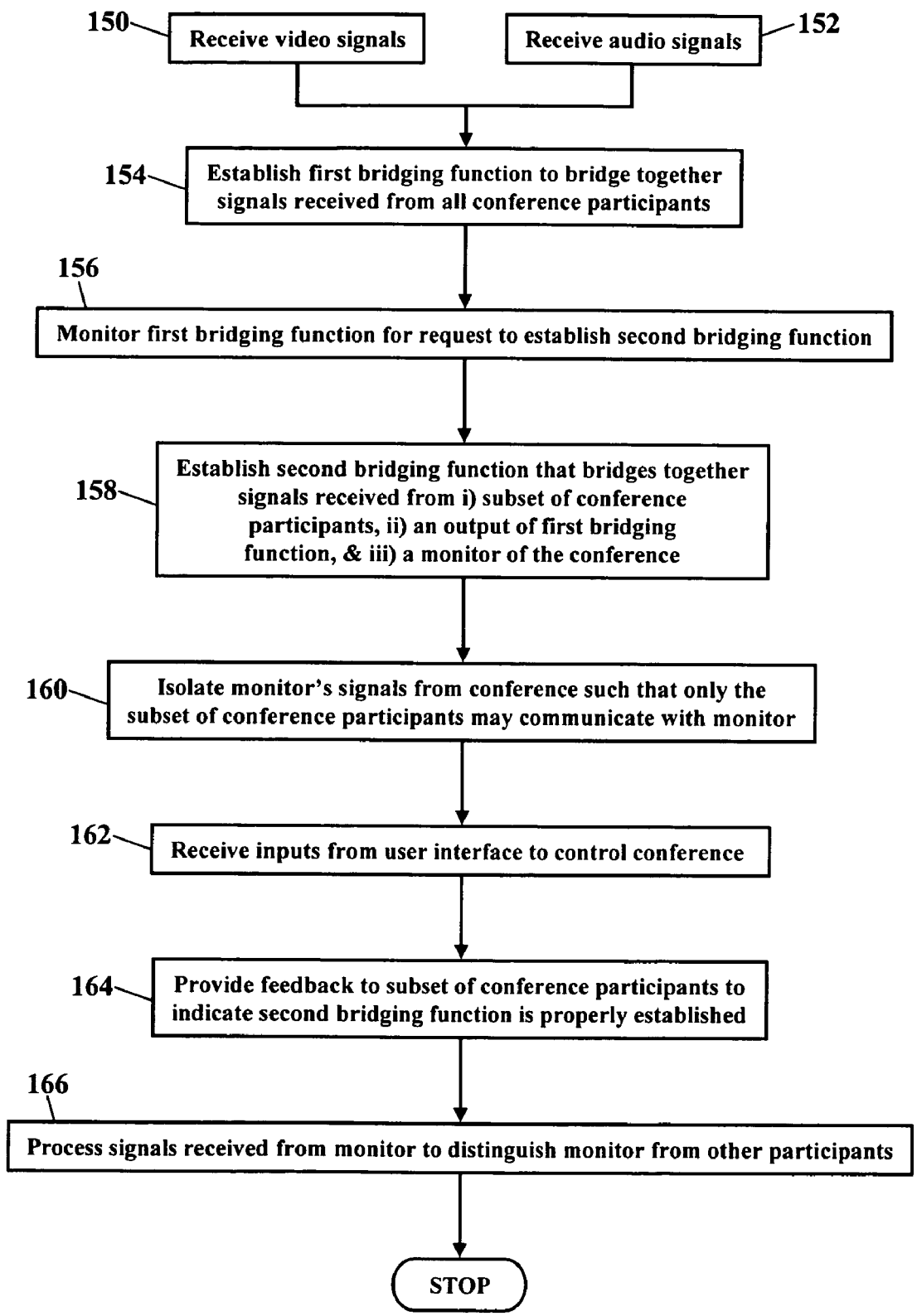
FIG. 8 is a flowchart illustrating a method for monitoring a conference, according to more exemplary embodiments.

FIG. 7 illustrates the graphical user interface 122. The participants 126 to the conference are illustrated. Each participant 126 may be identified by a live video image and/or by a photograph/picture. FIG. 8, however, simply illustrates a graphical name tag 128 associated with each participant. The graphical name tag 128 displays each participant's name 130 and any other information associated with the participant and/or information retrieved about that participant. How each participant 126 is identified, however, is not pertinent to this disclosure and, thus, not further discussed.

The graphical user interface 122 may include a solo control 132. The solo control 132 is a graphical control that establishes a sub-conference between the monitoring party 24 and that participant. When the monitoring party 24 desires to establish a sub-conference with the first party 20, the monitoring party 24 places or hovers a cursor 134 on the solo control 132. The monitoring party 24 may then select the solo control 132 to establish the sub-conference. When the monitoring party 24 selects the solo control 132, the monitoring party's complementary conferencing application (shown as reference numeral 120 in FIG. 6) establishes a sub-conference with the conferencing application 26. The monitoring party 24 may thus privately converse with the selected participant without the knowledge of the other participants. Note that FIG. 7 shows respective solo controls 136, 138, 140, and 142 for each participant in the conference. FIG. 7 thus illustrates that the monitoring party 24 may establish a private sub-conference with any participant by simply selecting that participant's solo control. The monitoring party 24 may thus privately coach or train any participant to the conference.

FIG. 8 is a flowchart illustrating a method for monitoring a conference, according to more exemplary embodiments. Video signals (Block 150) and/or audio signals (Block 152) are received. A first bridging function is established that bridges together signals received from all conference participants (Block 154). The first bridging function is monitored for a request to establish the second bridging function (Block 156). A second bridging function is established that bridges together signals received from i) a subset of the conference participants, ii) an output of the first bridging function, and iii) a monitor of the conference (Block 158). The second bridging function isolates the monitor's signals from the conference such that only the subset of the conference participants may communicate with the monitor during the conference (Block 160). Inputs may be received from a user interface to control the conference (Block 162). Feedback is provided to the subset of the conference participants, and the feedback indicates the second bridging function is properly established (Block 164). The signals received from the monitor may be processed to distinguish the monitor from the other participants (Block 166).

Figure 9:
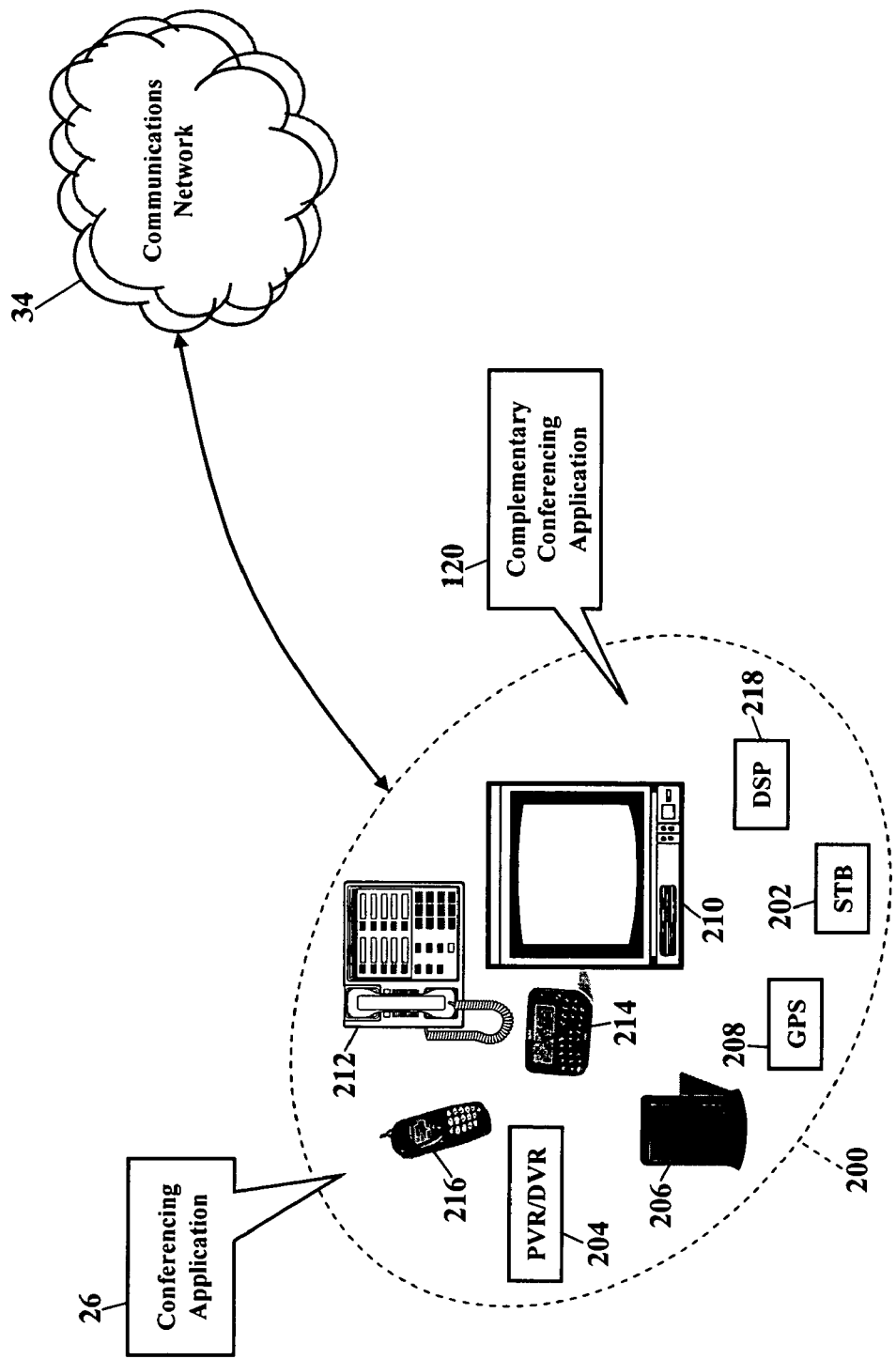
FIG. 9 depicts other possible operating environments for additional aspects of the exemplary embodiments.

FIG. 9 depicts other possible operating environments for additional aspects of the exemplary embodiments. FIG. 9 illustrates that the conferencing application 26 and/or the complementary conferencing application 120 may operate within various other communications devices 200. FIG. 9, for example, illustrates that the conferencing application 26 and/or the complementary conferencing application 120 may entirely or partially operate within a set-top box (202), a personal/digital video recorder (PVR/DVR) 204, personal digital assistant (PDA) 206, a Global Positioning System (GPS) device 208, an interactive television 210, an Internet Protocol (IP) phone 212, a pager 214, a cellular/satellite phone 216, or any computer system and/or communications device utilizing a digital signal processor (DSP) 218. The communications device 200 may also include watches, radios, vehicle electronics, clocks, printers, gateways, and other apparatuses and systems. Because the architecture and operating principles of the various communications devices 200 are well known, the hardware and software componentry of the various communications devices 200 are not further shown and described. If, however, the reader desires more details, the reader is invited to consult the following sources, all incorporated herein by reference in their entirety: LAWRENCE HARTE et al., GSM SUPERPHONES (1999); SIEGMUND REDL et al., GSM AND PERSONAL COMMUNICATIONS HANDBOOK (1998); and JOACHIM TISAL, GSM CELLULAR RADIO TELEPHONY (1997); the GSM Standard 2.17, formally known *Subscriber Identity Modules, Functional Characteristics* (GSM 02.17 V3.2.0 (1995-01))"; the GSM Standard 11.11, formally known as *Specification of the Subscriber Identity Module—Mobile Equipment (Subscriber Identity Module—ME)interface* (GSM 11.11 V5.3.0 (1996-07))"; MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); and EDWARD M. SCHWALB, iTV HANDBOOK: TECHNOLOGIES AND STANDARDS (2004).

The conferencing application 26 and/or the complementary conferencing application 120 may be physically embodied on or in a computer-readable media or medium. This computer-readable media/medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the exemplary embodiments, allow the exemplary embodiments to be easily disseminated. A computer program product comprises the conferencing application 26 and/or the complementary conferencing application 120 stored on the computer-readable media or medium. The conferencing application 26 and/or the complementary conferencing application 120 comprises computer-readable instructions/code for monitoring conferences, as hereinabove explained. The conferencing application 26 and/or the complementary conferencing application 120 may also be physically embodied on or in any addressable (e.g., HTTP, I.E.E.E. 802.11, Wireless Application Protocol (WAP), or BLUETOOTH®) wireless device capable of presenting an IP address.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method of monitoring a conference, comprising:
   receiving first party signals from a first participant's communications device at a first splitter;
   receiving second party signals from a second participant's communications device at a separate second splitter;
   sending the first party signals from the first splitter to a first bridge device;
   sending the first party signals from the first splitter to a separate second bridge device;
   sending the second party signals from the second splitter to the first bridge device;
   sending the second party signals from the second splitter to the second bridge device;
   receiving monitor signals from a monitor's communications device at the second bridge device;
   establishing a first bridge in the first bridge device that bridges together the first party signals and the second party signals to establish a conference output signal;
   sending the conference output signal only to the second participant's communications device to establish the conference between the first participant's communications device and the second participant's communications device;
   establishing a second bridge in the separate second bridge device that bridges together the first party signals, the second party signals, and the monitor signals to produce a sub-conference signal;
   isolating the monitor signals from the second participant's communications device by sending the sub-conference signal to the first participant's communications device and to the monitor's communications device to establish a sub-conference between the first participant's communications device and the monitor's communications device,
   wherein the monitor party may monitor the conference and conduct the sub-conference with a first party at the first participant's communications device.

2. The method according to claim 1, wherein the first bridge device bridges together video signals.

3. The method according to claim 1, wherein the first bridge device bridges together audio signals.

4. The method according to claim 1, further comprising providing feedback to the sub-conference that indicates the separate second bridge is properly established.

5. The method according to claim 1, further comprising monitoring the first bridge for a request to establish the separate second bridge.

6. The method according to claim 1, further comprising processing distinguishing the monitor signals to distinguish a monitor from a first party and a second party to the conference.

7. The method according to claim 1, further comprising receiving inputs from a user interface that control the conference.

8. A computer readable non-transitory medium storing computer-readable instructions for performing a method, the method comprising:
   receiving first party signals from a first participant's communications device at a first splitter;
   receiving second party signals from a second participant's communications device at a separate second splitter;
   sending the first party signals from the first splitter to a first bridge device;
   sending the first party signals from the first splitter to a separate second bridge device;
   sending the second party signals from the second splitter to the first bridge device;
   sending the second party signals from the second splitter to the separate second bridge device;
   receiving monitor signals from a monitor's communications device at the separate second bridge device;
   bridging the first party signals with the second party signals in the first bridge device to produce a conference output signal;
   sending the conference output signal only to the second participant's communications device to establish a conference between the first participant's communications device and the second participant's communications device;
   bridging the first party signals, the second party signals, and the monitor signals in the separate second bridge device to produce a sub-conference output signal; and
   isolating the monitor signals from the second participant's communications device by sending the sub-conference signal to the first participant's communications device and to the monitor's communications device to establish a sub-conference between the first participant's communications device and the monitor's communications device, wherein the monitor party may monitor the conference and conduct the sub-conference with a first party at the first participant's communications device.

9. The computer readable non-transitory medium according to claim 8, further comprising instructions for bridging together video signals.

10. The computer readable non-transitory medium according to claim 8, further comprising instructions for bridging together audio signals.

11. The computer readable non-transitory medium according to claim 8, further comprising instructions for providing feedback to the sub-conference output signal to indicate the sub-conference is properly established.

12. The computer readable non-transitory medium according to claim 8, further comprising instructions for monitoring the conference for a request to establish the sub-conference.

13. The computer readable non-transitory medium according to claim 8, further comprising instructions for distinguishing the monitor signals.

14. An apparatus, comprising:
   a first splitter receiving first party signals from a first participant's communications device;
   a separate second splitter receiving second party signals from a second participant's communications device;
   a first bridge device receiving the first party signals from the first splitter and receiving the second party signals from the separate second splitter, the first bridge device bridging the first party signals with the second party signals to produce a conference output signal, the first bridge device communicating the conference output signal to the second participant's communications device to produce the conference between the first participant's communications device and the second participant's communications device; and
   a separate second bridge device receiving the first party signals from the first splitter, receiving the second party signals from the separate second splitter, and receiving monitor signals from a monitor's communications device, the separate second bridge device bridging the first party signals, the second party signals, and the monitor signals to produce a sub-conference output signal, the separate second bridge device isolating the monitor signals from the second participant's communications device by sending the sub-conference output signal to the first participant's communications device and to the monitor's communications device to establish a sub-conference between the first participant's communications device and the monitor's communications device,
wherein the monitor party may monitor the conference and conduct the sub-conference with a first party at the first participant's communications device device.

* * * * *